United States Patent [19]
Iijima

[11] Patent Number: 5,414,835
[45] Date of Patent: May 9, 1995

[54] IC CARD PROCESSING SYSTEM CAPABLE OF DETERMINING SEND TIMING BETWEEN AN IC CARD AND AN ACCEPTING DEVICE

[75] Inventor: Yasuo Iijima, Yokohama, Japan

[73] Assignee: Kabushiki Kaisha Toshiba

[21] Appl. No.: 999,799

[22] Filed: Sep. 17, 1991

Related U.S. Application Data

[63] Continuation of Ser. No. 373,617, Jun. 27, 1989, abandoned, which is a continuation of Ser. No. 100,276, Sep. 23, 1987, abandoned.

[30] Foreign Application Priority Data

Nov. 19, 1986 [JP] Japan ................ 61-275798
Nov. 19, 1986 [JP] Japan ................ 61-275800

[51] Int. Cl.$^6$ .............................. G06K 5/00
[52] U.S. Cl. ..................... 395/550; 535/380;
364/DIG. 1; 364/DIG. 2; 364/231; 364/231.1;
364/269; 364/271.5; 364/925.6; 364/932;
364/932.1; 364/950
[58] Field of Search ............... 364/DIG. 1 MS File,
364/DIG. 2 MS File, ; 395/200, 250, 275, 325,
375, 500, 550, 575, 700, 800; 235/380, 381, 382,
382.5, 487, 488, 489, 490, 491, 492, 493, 494,
495

[56] References Cited

U.S. PATENT DOCUMENTS

| | | | |
|---|---|---|---|
| 4,211,919 | 8/1980 | Ugon ...................... | 235/487 |
| 4,523,297 | 9/1984 | Ugon et al. .............. | 364/900 |
| 4,575,621 | 3/1986 | Dreifus .................... | 235/380 |
| 4,727,244 | 2/1988 | Nakano et al. .......... | 235/380 |
| 4,734,568 | 3/1988 | Watanabe ............... | 235/487 |
| 4,736,094 | 4/1988 | Yoshida .................. | 235/379 |
| 4,804,825 | 2/1989 | Bitoh ...................... | 235/380 |
| 4,845,351 | 7/1989 | Hara et al. .............. | 235/492 |

FOREIGN PATENT DOCUMENTS

| | | | |
|---|---|---|---|
| 60-220645 | 5/1985 | Japan ................ | 371/32 |
| 60-117944 | 6/1985 | Japan . | |
| 60-207986 | 10/1985 | Japan . | |

OTHER PUBLICATIONS

Nikkei Electronics; Dec. 2, 1995; p. 281.
English OPatent Abstract of Japan "Data Transmission System," vol. 10, No. 75 (Nov. 5, 1985).

Primary Examiner—Robert B. Harrell
Attorney, Agent, or Firm—Cushman Darby & Cushman

[57] ABSTRACT

According to a portable electronic apparatus processing system of this invention, an IC card sends, to an IC card reader/writer, first timer data included in an answer to reset signal and defining a time after it sends the answer to reset signal to the IC card reader/writer until an instruction is received from the IC card reader/writer. The IC card receives a first instruction from the IC card reader/writer and executes corresponding processing. The IC card also sends second timer data included in the answer to reset signal and defining a time after the processed result is sent to the card reader/writer until the next instruction is received from the card reader/writer. The card reader/writer sets the first timer data in a timer, and sets the second timer data in a memory. The card reader/writer sends the first instruction to the IC card in response to a time out signal from the timer. When the card reader/writer receives the processed result from the IC card, it reads out the second timer data from the memory, and sets the readout data in the timer. Then, the reader/writer sends the next instruction to the IC card in response to the time out signal from the timer.

5 Claims, 8 Drawing Sheets

IC CARD PROCESSING SYSTEM CAPABLE OF DETERMING SEND TIMING BETWEEN AN IC CARD AND AN ACCEPTING DEVICE

This is a continuation of application Ser. No. 07/373,617, filed On Jun. 27, 1989, which was abandoned upon the filing hereof, and which is a continuation of application Ser. No. 07/100,276, filed Sep. 23, 1987, abandoned on Jun. 27, 1989.

BACKGROUND OF THE INVENTION

The present invention relates to a transmission method between a card reader/writer and an IC card.

A processing system has been developed wherein half-duplex data transmission is performed between a card reader/writer and an IC card. In this processing system, a control program in the IC card is started in response to a reset signal from the card reader/writer The IC card receives and decodes an instruction supplied from the card reader/writer to execute corresponding processing. Thereafter, the IC card sends the processed result as response data to the card reader/writer. In this case, the card reader/writer must recognize a transmission protocol of the IC card.

However, different IC cards normally have different transmission protocols. After it is recognized that the reset state is canceled by the reset signal, the IC card sends initial response data called "Answer to Reset" in order to signal the transmission protocol and the like to the card reader/writer. The answer to reset signal consists of 8 through 32 bytes and includes transmission protocol data. The transmission protocol data includes, e.g., a data transmission rate, data indicating whether or not a parity bit is affixed, data indicating whether parity check is performed or even/odd numbered parities, data indicating positive or negative logic, and the like. Thereafter, the IC card awaits input instruction data. In this case, a time between when the initial response data is sent and when an instruction data waiting state is established depending on the type of IC card. However, there is no means for detecting this difference in time. Therefore, when the card reader/writer that designates processing to the IC card sets a time interval from when initial response data is received until next instruction data is sent, a maximum time interval for respective types of IC cards is set. Because the maximum time interval is used, an appropriate most efficient send timing of instruction data for the respective types of IC card cannot be obtained.

SUMMARY OF THE INVENTION

It is an object of the present invention to provide a portable electronic apparatus processing system wherein a card reader/writer can recognize a difference in time between when initial response data is received from an IC card and when an instruction is sent. An appropriate send timing of an instruction for each type of IC card is determined based on the recognized difference in time.

In order to achieve the above object, according to the present invention, there is provided a portable electronic apparatus processing system constituted by a portable electronic apparatus handling apparatus for outputting an instruction indicating a content of processing, and a portable electronic apparatus which is connected to the portable electronic apparatus handling apparatus as needed. The portable electronic apparatus receives the instruction in accordance with a half-duplex data transmission method, performs processing corresponding to the instruction, and supplies a processed result to the portable electronic apparatus handling apparatus. The portable electronic apparatus supplies a reset signal to the portable electronic apparatus. The portable electronic apparatus then sends back, to the electronic apparatus handling apparatus, an answer to the reset signal which is in response to the reset signal. The answer to reset includes timer data defining the amount of time required between when the answer to reset signal is sent to the portable electronic apparatus handling apparatus and the next instruction can be received from the portable electronic apparatus handling apparatus. The portable electronic apparatus handling apparatus has a timer, to set the timer data included in the answer to reset signal in the timer, and supplies the instruction to the portable electronic apparatus in response to a time out signal from the timer.

DETAILED DESCRIPTION OF THE PREFERRED EMBODIMENTS

Figure 1:
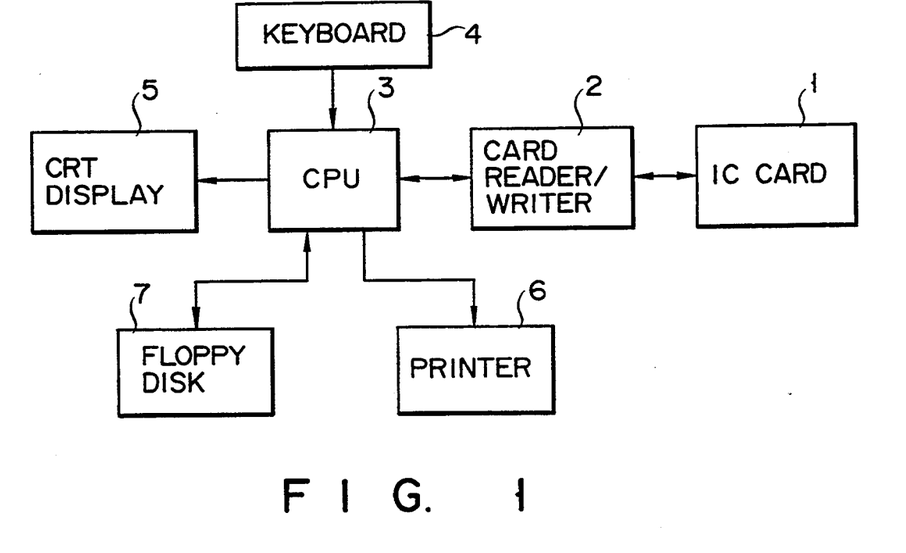
FIG. 1 is a block diagram showing the arrangement of a conventional card handling apparatus.

FIG. 1 shows the arrangement of a card handling apparatus used as a terminal device for a home banking system or a shopping system. IC card 1 can be connected to central processing unit (CPU) 3 through card reader/writer 2. CPU 3 is connected to keyboard 4, CRT display 5, printer 6, and floppy disk device 7.

Figure 2:
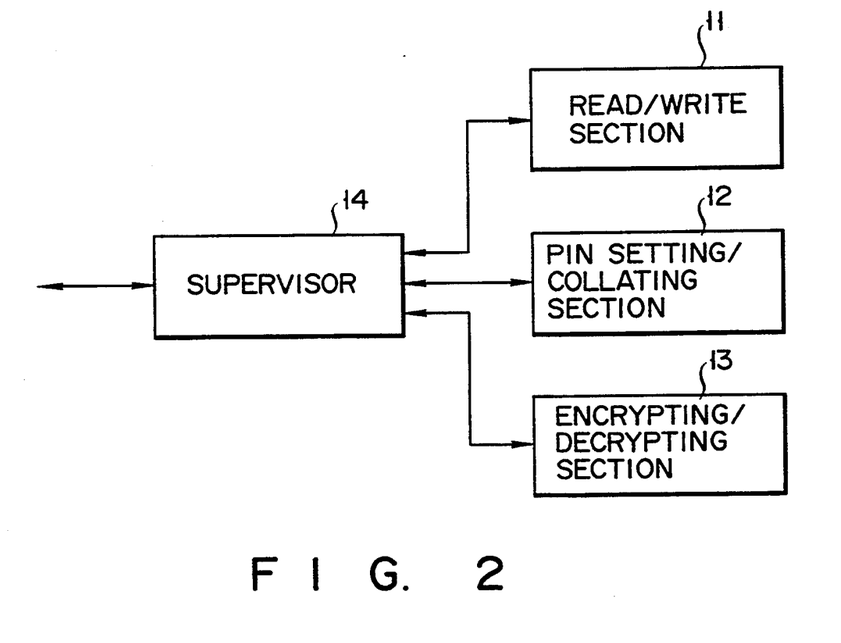
FIG. 2 is a block diagram showing functions of a conventional IC card.

IC card 1 is carried by a user, and collates a personal identification number (PIN) known by only the user upon purchasing of a commodity and stores necessary data. FIG. 2 shows functional blocks of IC card 1. IC card 1 functionally comprises a section for executing basic functions such as read/write section 11, PIN setting/collating section 12, encrypting/decrypting section 13, and supervisor 14 for controlling these basic functions. Read/write section 11 performs data read, write, and erase accesses with data memory 16. PIN setting/collating section 12 performs storage and read inhibition processing of a PIN set by the user, and each time a PIN is input, collates the input PIN with the preset PIN to provide a permission for the subsequent processing. Encrypting/decrypting section 13 performs encryption for preventing disclosure and forgery of communication data when data is transmitted from CPU 3 to another terminal through a communication line, and decrypts encrypted data. Data encryption is performed in accordance with an encryption algorithm having sufficient encryption power such as Data Encryption Standard (DES). Supervisor 14 decodes either a function code input from card reader/writer 2 or a function code with data. Based on the decoded function code, supervisor 14 selects and executes a necessary function from the basic functions.

Figure 3:
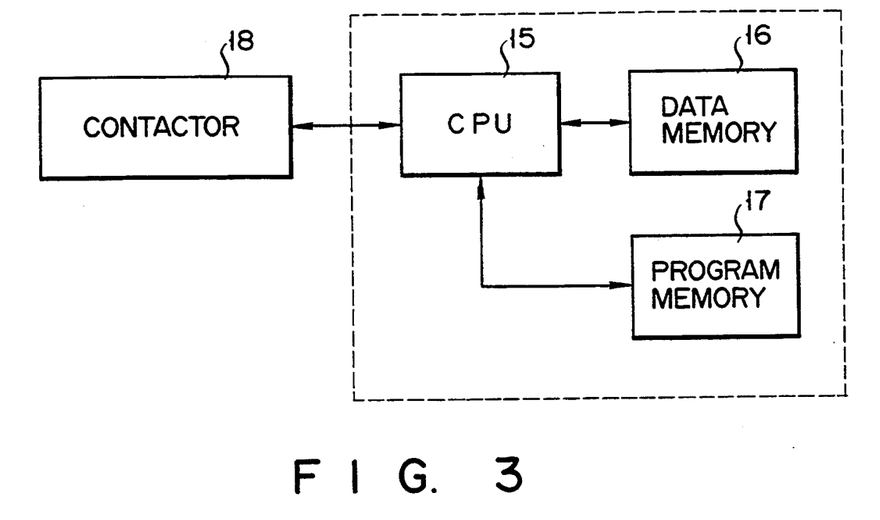
FIG. 3 is a block diagram showing the arrangement of an IC chip incorporated in an IC card to which the present invention is applied.
Figure 4:
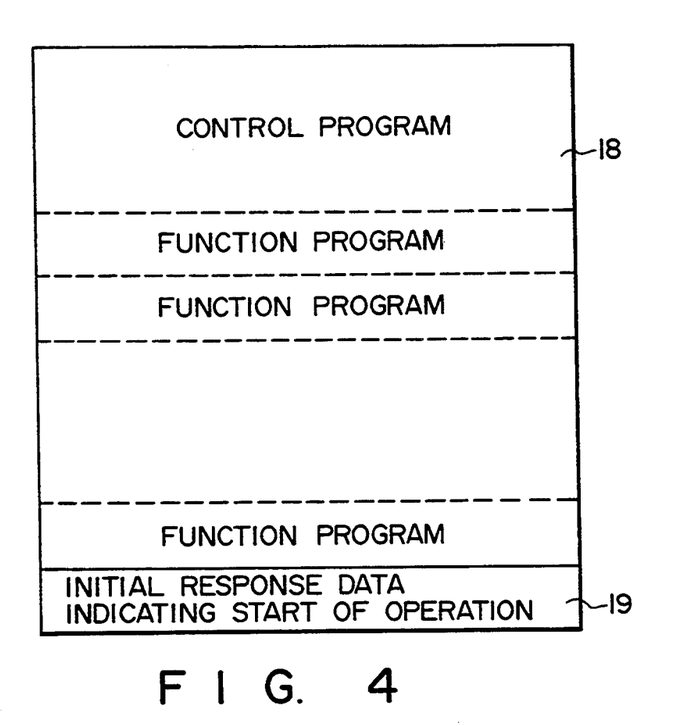
FIG. 4 shows a memory map of the program memory in FIG. 3.

In order to effect these functions, IC card 1 is constituted by central processing unit (CPU) 15, nonvolatile data memory 16 whose storage content is erasable, program memory 17, and contactor 18 for electrically contacting card reader/writer 2, as shown in FIG. 3. Of these components, a section surrounded by a dotted line is constituted by a single IC chip. Program memory 17 comprises, e.g., a mask ROM. The mask ROM stores a control program area 18 for CPU 15 having subroutines for realizing the above basic functions, and initial response data area 19 indicating start of IC card 1, as shown in FIG. 4. Data memory 16 is used for storing various data, and comprises, e.g., an EEPROM.

Figure 5:
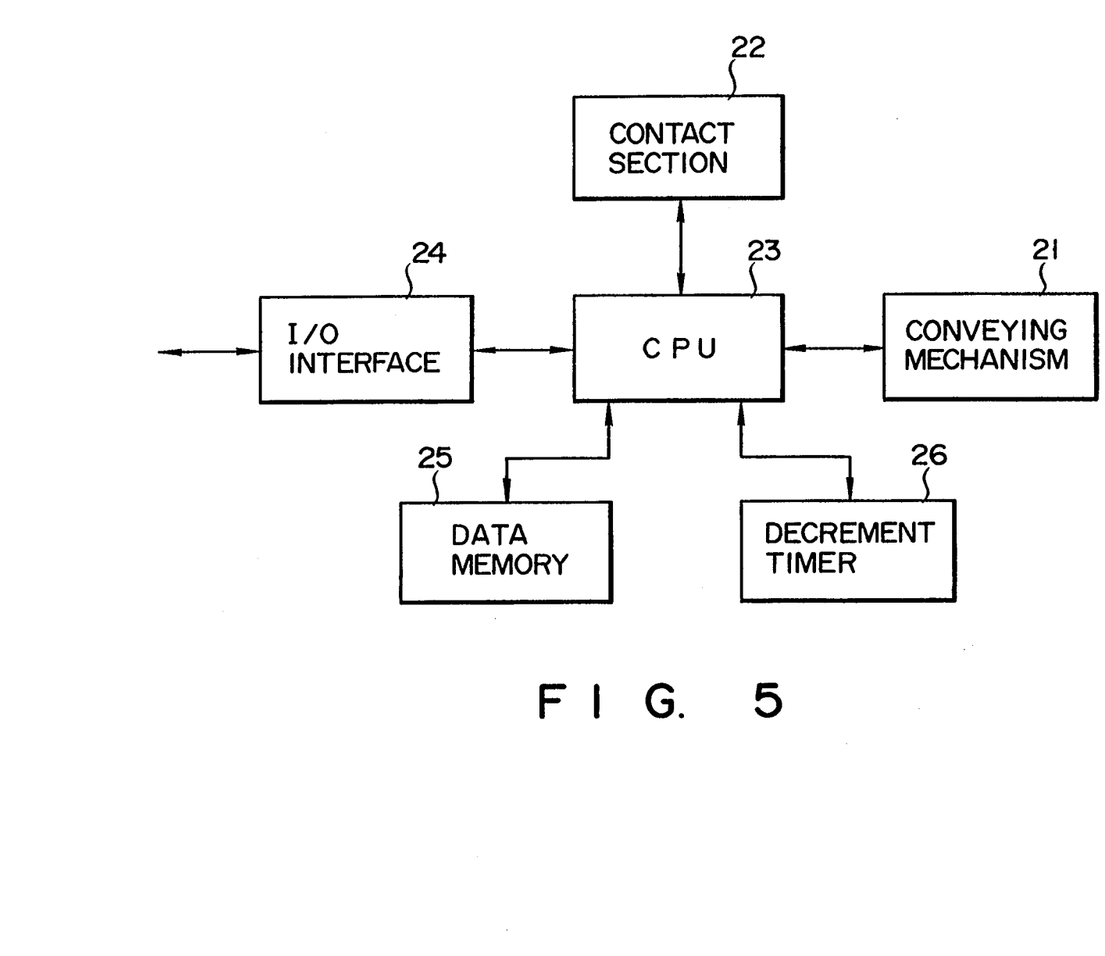
FIG. 5 is a detailed block diagram of the card reader/writer in FIG. 1.

Card reader/writer 2 exchanges an operation code or data between IC card 1 and CPU 3. More specifically, as shown in FIG. 5, card reader/writer 2 comprises conveying mechanism 21 for conveying IC card 1 inserted in a card insertion port (not shown) to a predetermined position, contact section 22 electrically contacting contactor 18 of IC card 1 set at the predetermined position, central processing unit (CPU) 23 for controlling the entire apparatus, I/O interface 24 for exchanging instruction data and response data between CPUs 23 and 3, data memory 25 for storing data, and decrement timer 26. When an initial value is set in timer 26, the count of timer 26 becomes "0" after a time interval corresponding to the initial value has passed.

Figure 6:
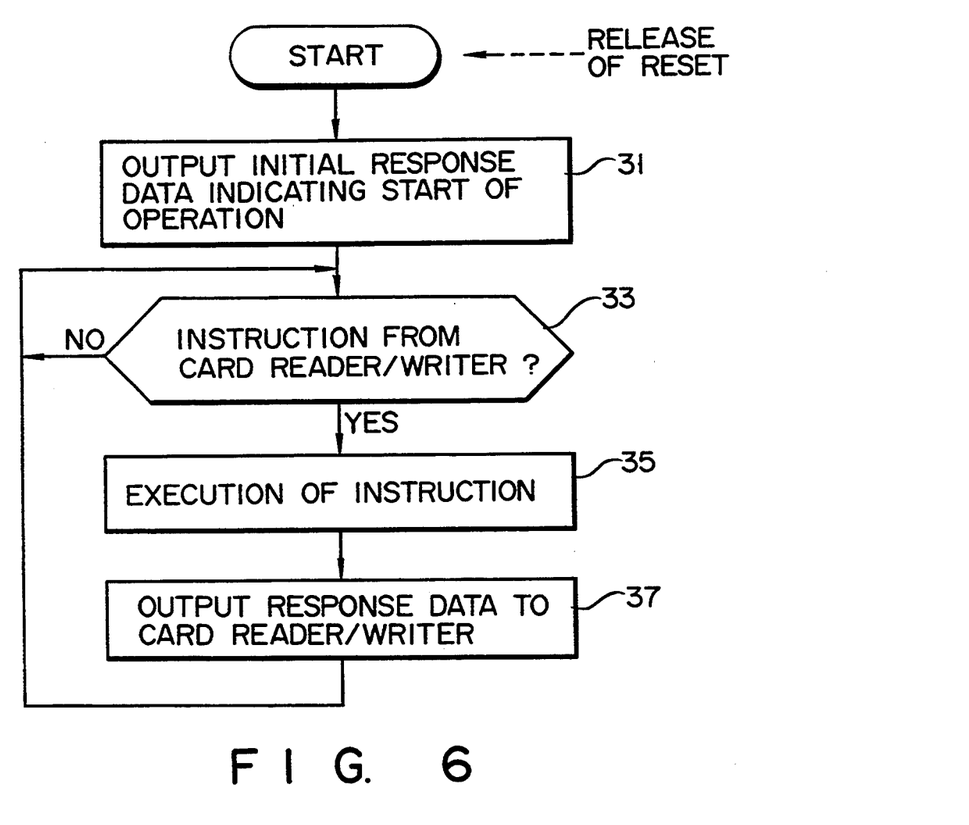
FIG. 6 is a flow chart for explaining the operation of an IC card.

The operation of the above arrangement will now be described. IC card 1 is operated in accordance with the flow chart shown in FIG. 6. More specifically, a reset signal from card reader/writer 2 which acts as a start control signal is set in a reset release state. Responsive to this reset signal is CPU 15 of IC Card 1 outputs initial response data indicating start of operation of program memory 17 within a predetermined period of time. The initial response data consists of transmission protocol use data of IC card 1, timer data from when the initial response data indicating the start of operation is output until instruction data from card reader/writer 2 may be received, and the like. After CPU 15 outputs the initial response data in step 31, it awaits instruction data from card reader/writer 2 in step 33. If the instruction data from card reader/writer 2 is input in step 33, CPU 15 executes processing corresponding to the instruction in step 35, and outputs response data indicating the processed result to card reader/writer 2 in step 37. Then, the flow returns to step 33.

Figure 7A:
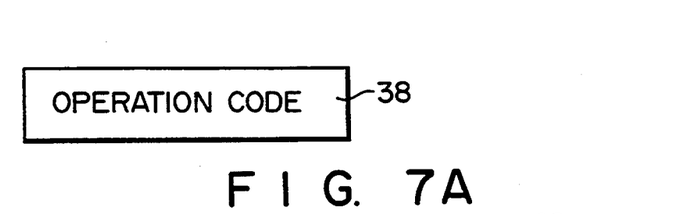
FIGS. 7A and 7B show formats of an instruction output from the card reader/writer.
Figure 7B:
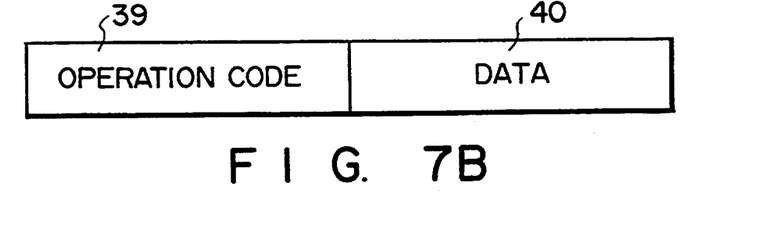

The instruction data output from card reader/writer 2 to IC card 1 includes an instruction consisting of only an operation code (OP code) field 38, as shown in FIG. 7A, and an instruction consisting of the OP code field 39 and data field 40 as shown in FIG. 7B.

Figure 8A:
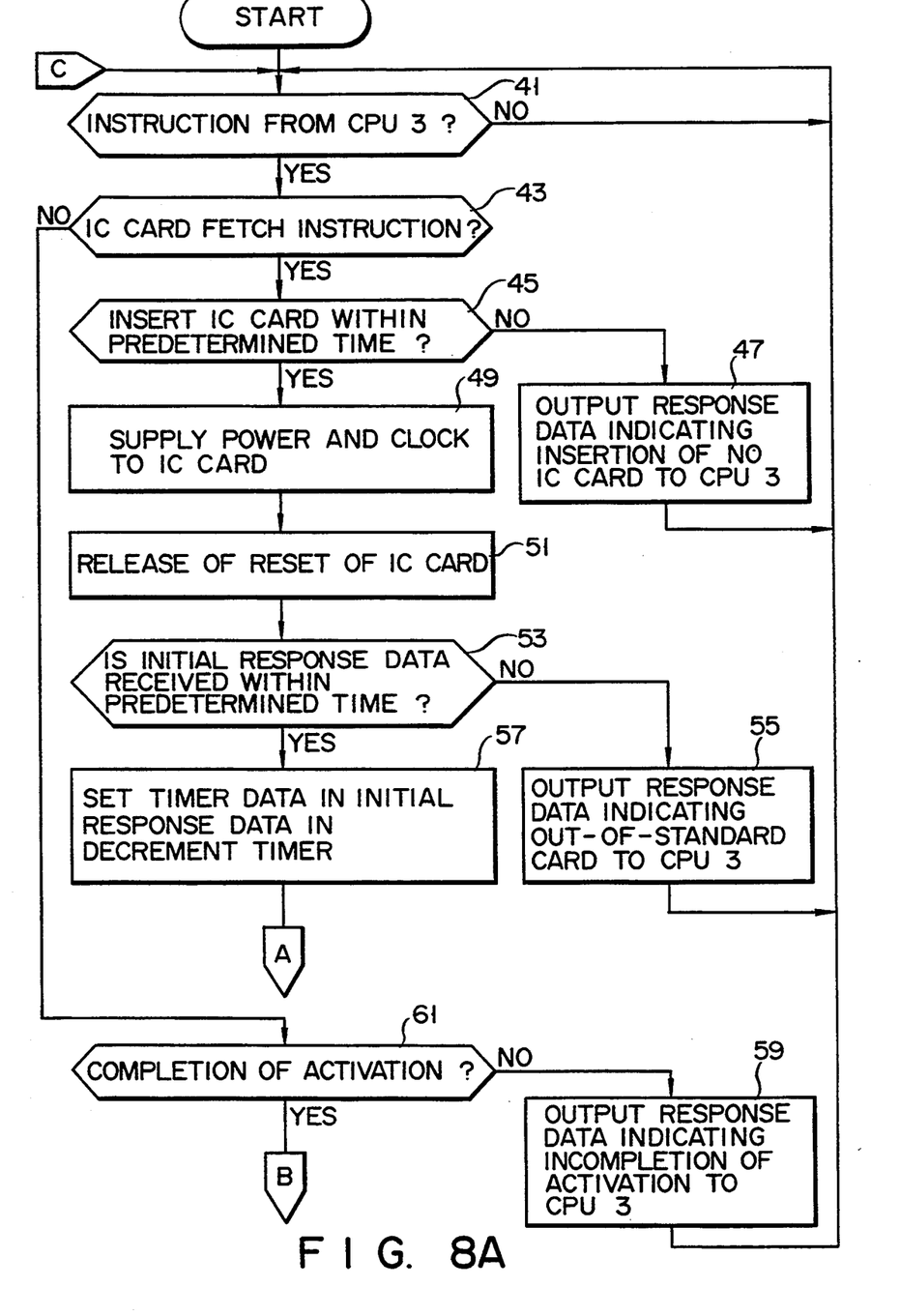
FIGS. 8A and 8B are flow charts for explaining a detailed operation of the card reader/writer according to an embodiment of the present invention.
Figure 8B:
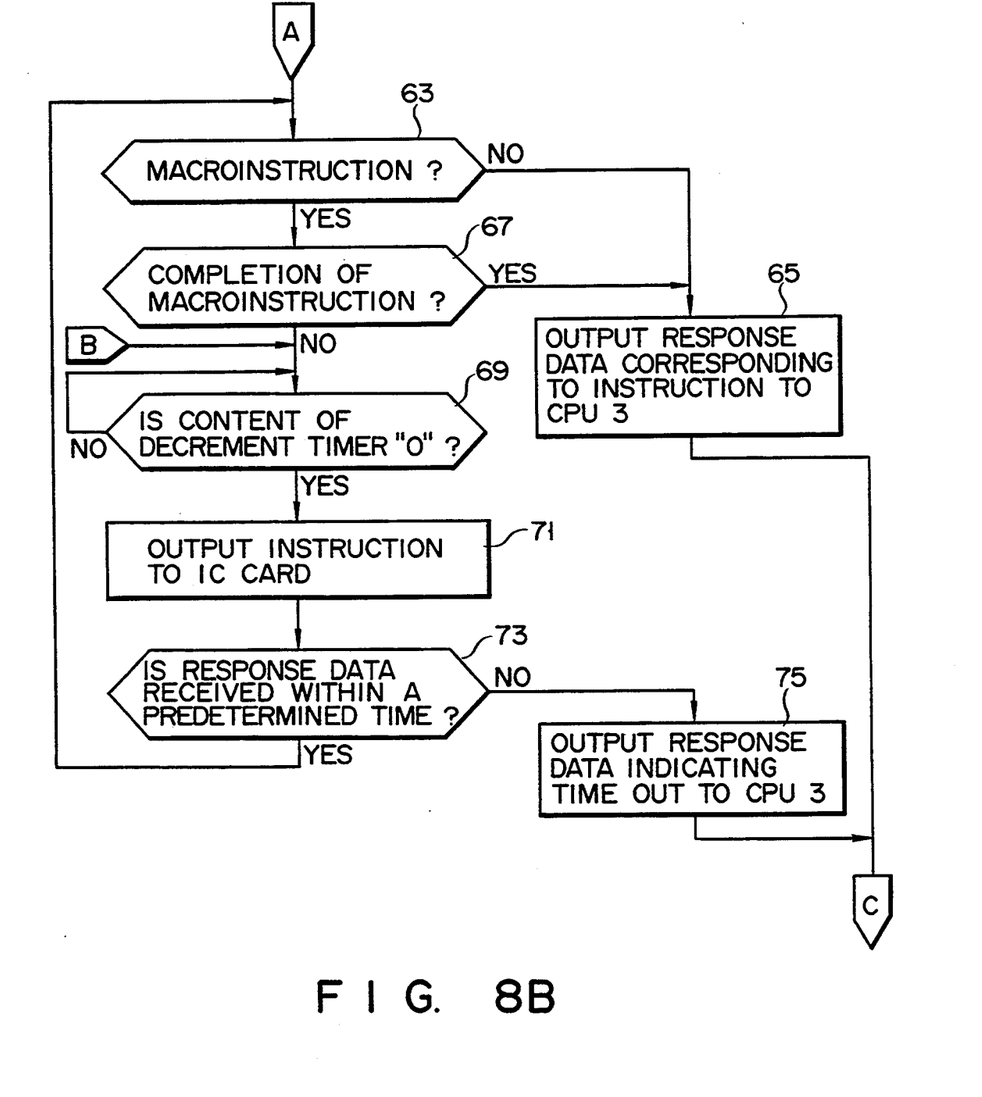

The operation of card reader/writer 2 will now be described with reference to the flow chart shown in FIGS. 8A and 8B. In step 41, CPU 23 awaits an instruction from CPU 3. If YES is obtained in step 41, CPU 23 checks in step 43 if the input instruction is an IC card fetch instruction. If YES in step 43, CPU 23 checks in step 45 if the IC card is inserted. If NO in step 45, the flow advances to step 47, and CPU 23 outputs response data indicating insertion of no IC card to CPU 3. Then, the flow returns to step 41 to await an instruction from CPU 3. However, if YES in step 45, i.e., if IC card 1 is inserted within a predetermined time, CPU 23 supplies power and clock signals to IC card 1 in step 49. In step 51, CPU 23 releases the reset state of IC card 1. The series of operations in steps 49 and 51 is called "activation". The "activation" herein has the following meaning. CPU 23 supplies a reset signal to IC card 1, and IC card 1 sends back an answer to reset signal to CPU 23 in response thereto. As a result, IC card 1 can be set in a state capable of receiving an instruction from CPU 23. CPU 23 checks in step 53 if the answer to reset signal as the initial response data from IC card 1 is received within a predetermined time. The initial response data includes timer data inherent to the type of IC card, i.e., timer data after the IC card sends the initial response data until it awaits next instruction data.

If NO in step 53, CPU 23 outputs response data indicating an out-of-standard card to CPU 3 in step 55. Then, the flow returns to step 41 to await an instruction from CPU 3. However, if YES in step 53, CPU 23 extracts timer data from the initial response data and sets the extracted data in decrement timer 26 in step 57.

CPU 23 checks in step 63 if the instruction from CPU 3 is a macroinstruction. In this case, the macroinstruction indicates an instruction from CPU 3 shown in FIG. 1. Instructions sent from CPU 3 to card reader/writer 2 normally include macroinstructions and other instructions. The macroinstruction is, e.g., a write instruction, and instructs data write access of several hundreds of bytes to card reader/writer 2. However, IC card 1 cannot accept several hundreds of bytes at once. Therefore, card reader/writer 2 must write data in IC card 1 several times. Other instructions include, e.g., a PIN collating instruction.

If NO in step 63, the flow advances to step 65, and CPU 23 receives the processed result corresponding to the instruction from IC card 1. Then, CPU 23 outputs the processed result to CPU 3. Thereafter, the flow returns to step 41, and CPU 23 awaits an instruction from CPU 3. On the other hand, if YES in step 63, the flow advances to step 67 to check if the macroinstruction is completed, i.e., if it is the last instruction in the macroinstruction (e.g., in the case of the write instruction, the last successive write instruction of some successive write instructions obtained by dividing the corresponding macroinstruction). If the macroinstruction is completed in step 67, CPU 23 outputs, to CPU 3, response data indicating the completion of processing corresponding to the macroinstruction from CPU 3 in step 65, and the flow returns to step 41. Then, CPU 23 awaits an instruction from CPU 3.

If the macroinstruction is not completed in step 67, the flow advances to step 69, and CPU 23 is set in a wait state until decrement timer 26 reaches "0". If it is determined in step 69 that decrement timer 26 has reached "0", CPU 23 sends, to the IC card, an instruction to be executed by the IC card, in step 71. It is checked in step 73 if response data from the IC card is received within a predetermined time. If NO in step 73, this means that no response data is sent from the IC card although decrement timer 26 has reached "0". Therefore, CPU 23 outputs response data indicating time out in step 75. Thereafter, the flow returns to step 41, and CPU 23 awaits an instruction from CPU 3. If YES in step 73, the flow returns to step 63 to check if the instruction from CPU 3 is a macroinstruction. In this manner, steps 63 through 73 are repeated until the macroinstruction is completed.

If it is determined in step 43 that the instruction from CPU 3 is not the IC card 1 fetch instruction, the flow advances to step 61, and CPU 23 checks if activation of IC card 1 is completed. If NO in step 61, the flow advances to step 59, and CPU 23 outputs response data indicating incompletion of activation to CPU 3. Then, the flow returns to step 41, and CPU 23 awaits an instruction from CPU 3. However, if YES in step 61, the flow advances to step 63, and CPU 23 performs the above-mentioned operations.

In this manner, the initial response data includes timer data after IC card 1 outputs initial response data indicating start of operation until it receives an instruction. Thus, card reader/writer 2 extracts the timer data from the initial response data, and can recognize an instruction send timing to IC card 1 based on the extracted timer data. More specifically, card reader/writer 2 receives the timer data sent from IC card 1 together with the initial response data. From this data, it recognizes a difference in time between reception of the initial response data and delivery of the instruction. This difference in time is due to the difference in type of IC card 1.

Figure 9A:
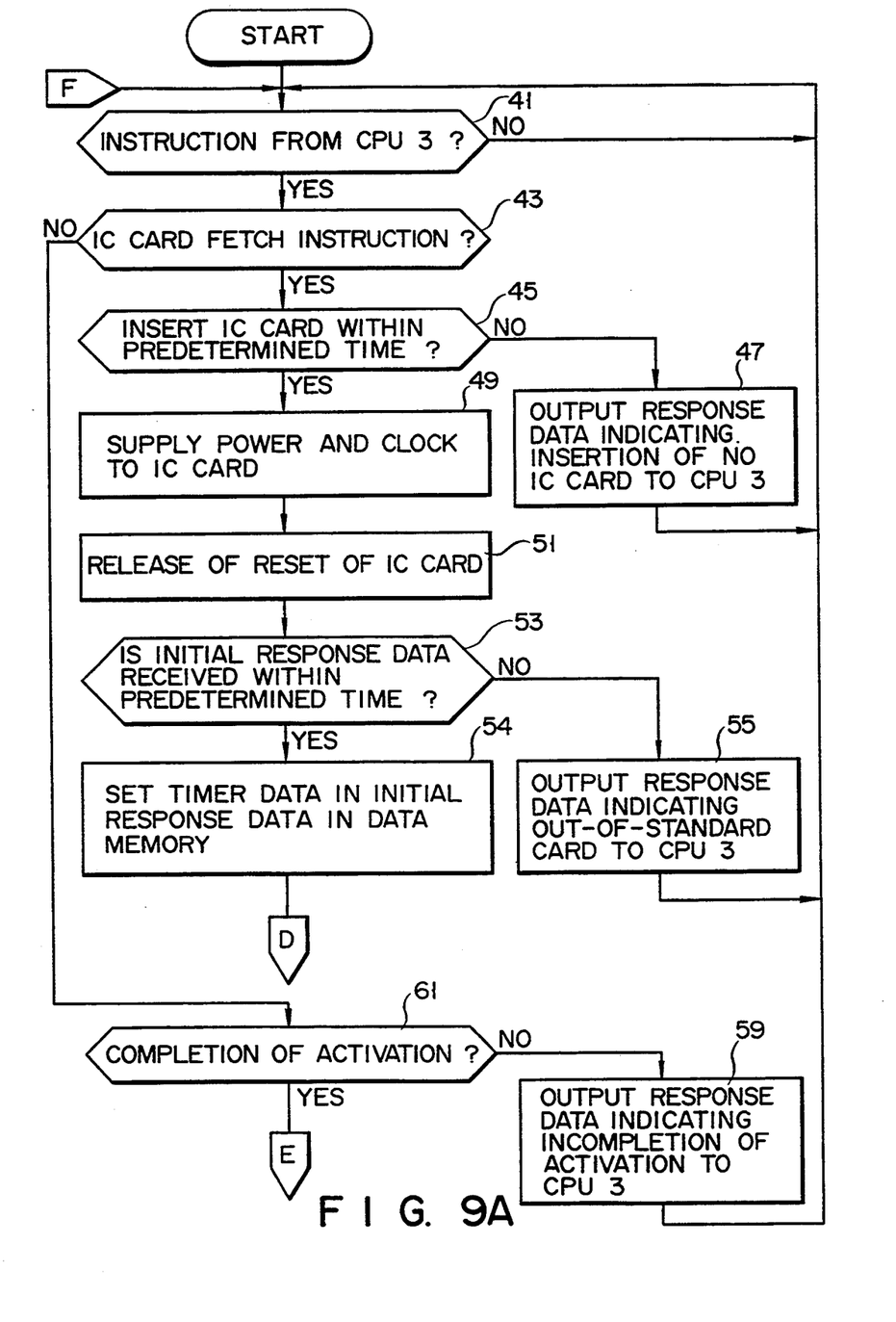
FIGS. 9A and 9B are flow charts for explaining a detailed operation of the card reader/writer according to another embodiment of the present invention.
Figure 9B:
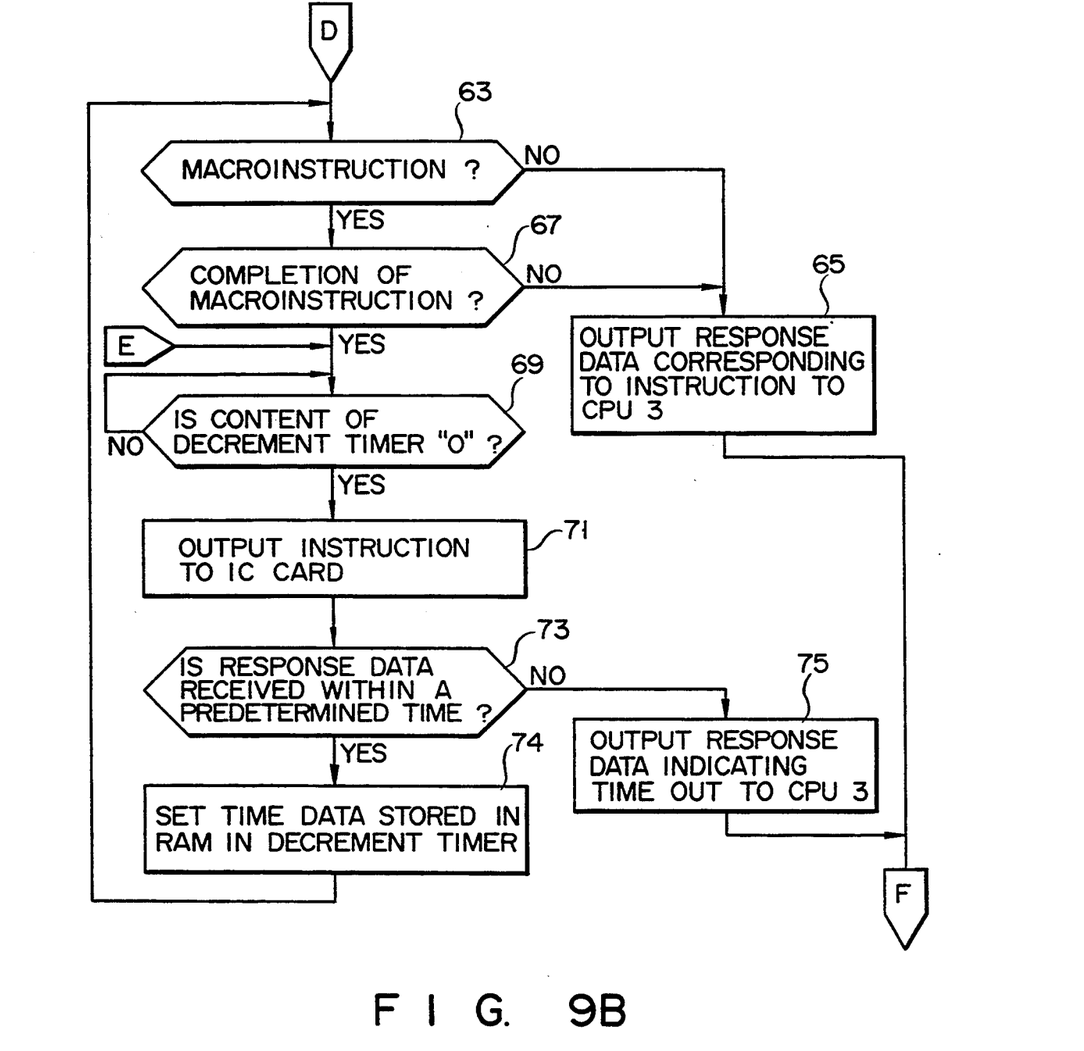

Another embodiment of the present invention will now be described with reference to the flow charts shown in FIGS. 9A and 9B. In this embodiment, initial response data includes timer data indicating the amount of time between when IC card 1 sends response data corresponding to an instruction until it receives next instruction data, so that card reader/writer 2 extracts the timer data from the response data, and can recognize an instruction send timing to IC card 1 based on the extracted timer data. The same reference numerals in this embodiment denote the same steps as in FIGS. 8A and 8B, and a detailed description thereof will be omitted. The differences between the flow charts shown in FIGS. 9A and 9B and FIGS. 8A and 8B are steps 54 and 74. More specifically in step 57 in FIG. 8A, the timer data in the initial response data is set in decrement timer 26. However, in step 54 in FIG. 9A, the timer data in the initial response data is set in data memory 25. When the response data from IC card 1 is received within a predetermined time in step 73 in FIG. 9B, the timer data stored in data memory 16 (timer data between instructions) is set in decrement timer 26 in step 74.

Therefore, when card reader/writer 2 receives timer data output from IC card 1 together with initial response data, it can recognize, based on the timer data, a difference in time after response data corresponding to an instruction is received until the next instruction is received, which occurs due to a difference in type of IC card 1. Therefore, card reader/writer 2 can take an appropriate instruction send timing for each type of IC card based on the timer data.

In the above embodiment, timer data (first timer data) after IC card 1 sends the answer to reset signal to card reader/writer 2 until it receives the next instruction, and timer data (second timer data) after IC card 1 receives the first instruction and sends the corresponding processed result to card reader/writer 2 until it receives the next instruction are combined and affixed to the answer to reset signal, and IC card 1 sends the signal to card reader/writer 2. Card reader/writer 2 may set the first timer data in decrement timer 26 and may store the second timer data in data memory 25.

In the above embodiment, timer data in initial response data is extracted and is set in decrement timer 26 as an initial value. Immediately before an instruction is sent to IC card 1, card reader/writer 2 confirms that decrement timer 26 has reached "0". However, when decrement timer 26 has reached "0" after the timer data is set therein, the flow may advance to step 63. More specifically, processing of step 69 can be interposed between steps 57 and 63.

Decrement timer 26 comprises a hardware timer but can comprise a software timer.

In the above embodiment, timer data is included in initial response data and is registered. However, timer data and data in initial response data can be separately stored in data memory 16, and can be combined when they are sent.

In the above embodiment, transmission processing between card reader/writer 2 and IC card 1 has been described. However, the present invention can be applied to transmission processing between CPU 3 and card reader/writer 2.

What is claimed is:

1. An IC card processing system, comprising an IC card and an IC card reader/writer, the IC card including:
   means for initializing the IC card in response to a signal from an IC card reader/writer;
   means for transmitting initial response data to the IC card reader/writer, the initial response data including time data representing an amount of time required for preparing the IC card to receive a command from the IC card reader/writer after the initial response data is transmitted to the IC card reader/writer, and the IC card reader/writer including:
   means for receiving the initial response data transmitted from the IC card;
   means for determining whether or not the initial response data has been received within a predetermined time;
   counter means for counting until a count value reaches a set time;
   means for setting the set time in the counter means when the determining means determines that the response data is received within the predetermined time, the command being permitted to be sent to the IC card after the set time has elapsed, the set time being based upon the time data included in the received initial response data; and
   means for sending the next command after the counter means counts the set time.

2. The IC card processing system according to claim 1, wherein the time data is related to a specific type of the IC card.

3. The IC card processing system according to claim 1, wherein the initial response data includes:
   a first time data representing an amount of time required for initializing the DC card to receive a first command; and
   a second time data representing a time required for preparing the IC card to receive each subsequent command after the first command.

4. An IC card processing system comprising an IC card and an IC card reader/writer, the IC card reader/writer communicating with the IC card in accordance with half-duplex data transmission, the system comprising:

means, provided in the IC card reader/writer, for sending a reset signal to the IC card when the IC card is set in the IC card reader/writer;

means, provided in the IC card, for performing a reset operation in response to the reset signal from the IC card reader/writer while sending an answer-to-reset signal to the IC card reader/writer in response to the reset signal, the answer-to-reset signal including at least first timer data being based on an amount of time required for executing the reset operation of components within the IC card, and second timer data being based on an amount of time required for the IC card prepare to receive an instruction after the reset signal from the IC card reader/writer; and means, providing in the IC card reader/writer, for sending the instruction after an indicated amount of time has elapsed, the indicated amount of time being based on at least one of the first and second timer data.

5. The system according to claim 4, wherein the first and second time data are inherent to a type of the IC card.

* * * * *